INVENTOR.
JOHN SHERMAN STRANCE
BY
Meyer, Tilberry & Body
ATTORNEYS

United States Patent Office

3,510,091
Patented May 5, 1970

3,510,091
LAUNCH OR RECOVERY SYSTEM FOR AIRCRAFT
John Sherman Strance, Dover, Mass., assignor to
E. W. Bliss Company, Canton, Ohio, a corporation of Delaware
Filed Dec. 11, 1967, Ser. No. 689,713
Int. Cl. B64f 1/08
U.S. Cl. 244—63                                         8 Claims

ABSTRACT OF THE DISCLOSURE

There is provided an aircraft launch system of the type adapted for catapults utilizing coilable elements adapted to be wound around a reel and in installations having restricted runways. This improvement includes the provision of a signal directly related to the speed of the reel coiling the launch element and subtracting such signal with a second signal always greater than the first, the resultant or difference signal being applied to a torsional device that is coupled to and controls the speed of the reel.

---

Figure 1:
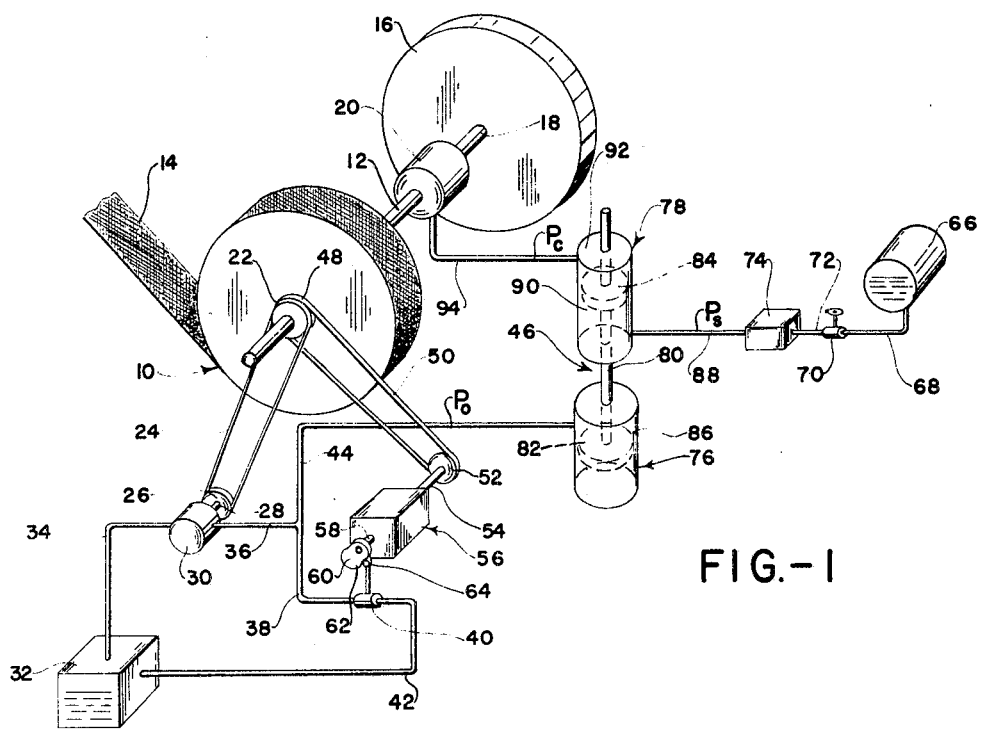

The present invention pertains to the art of launch systems for aircraft and more particularly to an improvement in the control means for the drive assembly thereof.

The present invention is particularly applicable to catapults of the type in which a woven textile tape is connected at one end to the aircraft to be launched, the tape being wound upon a reel at high speed to catapult the aircraft into flight, and it will be discussed with particular reference thereto; however, it is to be appreciated that the invention has much broader application and may be used to launch objects other than aircraft, such as missiles, where the launching space is limited.

The take-off of aircraft from a short runway, such as the deck of a ship, creates substantial problems due to factors such as the space available, the high speeds required for proper launching of the aircraft, and variables such as the type of aircraft being launched, wind speed and direction and the like. It is known to use launching apparatus in which a woven textile tape is connected at one end to the aircraft to be launched, the tape being wound about a reel at high speed to catapult the aircraft into flight. The winding or coiling reel is normally driven by a flywheel through a variable engagement type clutch for varying the driving torque between the flywheel and the reel. The speed control for the launch cycle is critical and must be properly programmed for optimum launch operations.

In the past, hydraulic control devices have been used which provide a source of hydraulic pressure for the clutch device. Generally, a pump, pressure regulator and valve arrangement are used to vary the cluch pressure according to a program that is a function of time, such valve arrangements including variable orifices, by-pass valves and numerous other devices. Other systems utilize precharged bottles instead of pump and regulator assemblies. However, these devices have not been entirely adequate since they do not compensate for the actual speed of the reel, which may vary due to such factors as clutch wear, varying inertias, elasticity changes in the launching tape and the like. Thus, in those systems that are controlled according to a function of time, actual reel speed, and consequently aircraft speed, can vary considerably from the theoretical or programmed speed. Accordingly, there has been an ever-present demand for a control system that will provide feedback information reflecting the variables in reel speed, and the effect of reel speed relative to the programmed control.

The present invention is directed toward a control system that provides an hydraulic pressure feedback signal that takes into consideration the actual behavior of the launching device so that optimum reel speed can be maintained for accurate launch operations.

In accordance with the present invention, there is provided apparatus for assisting aircraft during a take-off cycle utilizing a coilable element, adapted to be wound on a reel, and a variable torque applying device which is controlled by the resultant of a supply pressure signal and a programmed pressure signal generated by reel rotation to accurately control the launch operation.

In accordance with another aspect of the present invention, there is provided apparatus for controlling a variable torque applying device which rotates a reel and in which the control for the device includes a cylinder and piston assembly receiving pressure signals in opposition, one of such signals being in accordance with a predetermined supply and the other of such signals being generated in accordance with the desired programmed speed of the rotating reel, such that the output from the cylinder and piston assembly to the torque applying device reflects the pressure difference between the two.

In accordance with a further aspect of the present invention, there is provided a control system for a variable torque applying device to rotate a launching reel, wherein a pump is driven directly by the rotating reel, which in conjunction with a valve member, creates a programmed signal to be combined with a supply pressure signal, the resultant being applied to the torque applying device to correct the actual speed of the rotating reel.

The primary object of the present invention is the provision of a self compensating hydraulic control system for a launching system wherein the aircraft speed is accurately controlled in accordance with a predetermined program and taking into account the actual behavior of the launching device.

Another object of the present invention is the provision of a control system for a launching system wherein the speed of a rotating reel is controlled by a pressure signal which is the resultant of a predetermined supply signal and a programmed signal proportional to the rotation of the reel.

Still another object of the present invention is the provision of a control system for a launching operation in which a programmed pressure signal is delivered to a pressure combining device that receives another pressure signal emitted in accordance with a predetermined supply of always larger magnitude, the difference or resultant pressure signal being applied to a variable torque applying device to correct the actual behavior of the rotating reel to optimum conditions.

Figure 2:
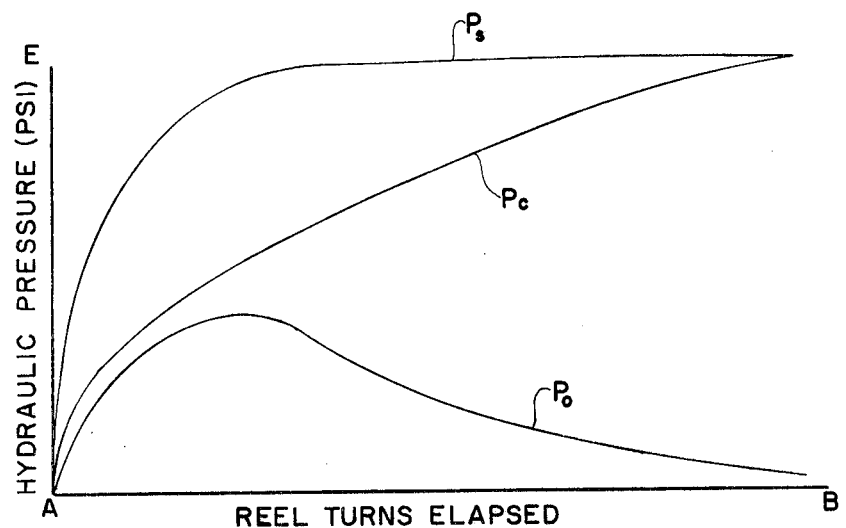

These and other objects and advantages will become apparent from the following description used to illustrate a preferred embodiment of the present invention, as read in connection with the accompanying drawing in which:

FIG. 1 is a schematic view of a portion of a flywheel energized catapult incorporating a control system in accordance with the present invention; and FIG. 2 is a diagram of curves illustrating various pressure signals for a typical launch cycle.

Referring now to the drawings, wherein the showings are for the purpose of illustrating a preferred embodiment of the invention only, and not for the purpose of limiting same, FIG. 1 best illustrates the structure in which the control assembly embodying the present invention is used. A catapult reel, indicated generally by the numeral 10, is suitably mounted on a driven shaft 12 and is rotated to coil a woven textile tape 14 therearound, the other end of the tape being attached to an aircraft to be launched in the manner known in the art.

The driving power for the reel 10 is provided in part by a flywheel 16, mounted on the driving shaft 18 connected to an hydraulically operated clutch 20, the output of which is the driven shaft 12 connected to the reel 10.

Clutch 20 is of the conventional slip type, wherein the relative rotational speeds between the flywheel 16 and the reel 10 are directly proportional to the variable torque provided by an hydraulically actuated clutch plate, not shown, within the assembly. An increase in hydraulic pressure to the clutch plate increases the torque applied to the driven shaft 12, as is known in the art.

Mounted on shaft 12 is a pulley 22 driving a belt 24 that is entrained about a second pulley 26 mounted on the end of a shaft 28 for driving a pump, indicated generally by the numeral 30. The pulley and belt arrangement 22–24–26, being directly mounted on the shaft 12, rotates along with the reel 10 and thus at the same speed. Suitably located is a reservoir 32, containing a fluid, which is connected to the input of the pump 30 by a suction line 34. The output side of the pump 30 is connected by a line 36 to a cross passage 38, one branch of which passes to a valve assembly, indicated generally by the numeral 40 and which will be hereinafter more particularly described. The outlet 42 from the valve 40 returns to the sump or reservoir 32. A second branch 44 of the cross passage leads to a piston and cylinder assembly, indicated generally by the numeral 46, which will be hereinafter more particularly described.

Also mounted on the driven shaft 12 and adjacent the pump pulley 22, is a second driving pulley 48 for driving a belt 50 which is in turn entrained around a pulley 52 on a shaft 54 extending from a reduction gear assembly 56, the gear assembly 56 having an output shaft 58 on which is mounted a cam 60. Gear reduction unit 56 is conventional in nature and is such as to assure that the rotational position of the cam 60 is the same for any given number of revolutions of the reel 10. That is for any given number of reel rotations, the cam position will be the same and correspondingly the opening of valve 40 will be the same since cam 60 engages a cam follower 64 to control the valve assembly 40 in a manner and for purposes to become hereinafter more apparent.

Suitably located is a second reservoir 66 having a conduit 68 leading therefrom to a shut-off valve 70, which in turn is connected by a conduit 72 to a solenoid valve 74, the purpose for which will become hereinafter more apparent.

The cylinder and piston assembly 46 includes a lower cylinder 76 spaced from an upper cylinder 78, and in which is reciprocably mounted a piston assembly, including a piston rod 80 having a piston 82 in the lower cylinder 76 and a piston 84 in the upper cylinder 78. Since the two pistons are connected to the shaft 80, they reciprocate together within their respective cylinders.

Conduit 44 from pump 30 leads to the upper chamber 86 of lower cylinder 76 such that pressure therein acts against the top surface of the piston 82. Conduit 88 leading from the solenoid valve 74 is connected to the lower chamber of upper cylinder 78 such that the pressure therein acts against the under surface of piston 84 and against the pressure on the lower piston 82. Extending from an upper chamber 92 in the upper cylinder 78 is a conduit 94 leading to the variable clutch 20 to provide pressure against the hydraulically actuated clutch plate.

The operation of the control system can best be understood by referring to the curves of FIG. 2 along with the aforedescribed structure. With reference to FIG. 2, which shows a series of pressure curves, the abscissa of the graph is Reel Turns Elapsed from the beginning of a launch at point A and terminating at the end of the launch at point B. The ordinate scale is the Hydraulic Pressure, in suitable units such as pounds-per-square-inch, going from a value of zero at point A to a maximum value at point E.

Curve $p_s$ represents a supply pressure that is supplied to the lower chamber 90 of the upper cylinder 78 through the conduit 88 from the solenoid valve 74 and from the reservoir 66. At the beginning of the launch cycle valves 70 and 74 are normally closed and the pressure $p_s$ is zero. As the launch cycle proceeds, the supply pressure $p_s$ is preferably varied by slowly opening the solenoid valve 74 through a suitable control arrangement, such as a rheostat not shown, so that the supply pressure application takes the forms shown in FIG. 2 and does not reach the maximum value at E until such time as a few reel turns have elapsed.

Curve $p_o$ in FIG. 2 represents the programmed output pressure from the hydraulic pump 30, through conduits 36 and 44 to the upper chamber 86 of the lower cylinder 76. The amount of pressure introduced to the cylinder 76 depends upon the by-pass through valve 40, as controlled by the volume of pump displacement in relation to the valve opening which is programmed by cam 60. It will be noted that the pressure $p_o$ entering the upper chamber of the lower cylinder 76 acts against the supply pressure $p_s$ in the lower chamber 90 of the upper cylinder 78, thus being subtractive. The pressure $p_o$ is thus directly proportional to the speed of reel 10 as modified by the programming function of cam 60. It is to be noted that the supply pressure $p_s$ will always exceed the programmed pressure $p_o$, thus there is always a net difference pressure $p_c$. The difference pressure $p_c$ (curve $p_c$) is conveyed from the upper chamber 92 of the upper cylinder 78 through conduit 94 and directly to the clutch 20.

Considering now a typical launch operation, prior to which the end of tape 14 is attached to the aircraft and the valves 70 and 74 are closed, the necessary power is applied to the flywheel 16 to cause rotation of the reel 10 through the clutch assembly 20. As the reel rotates, the hydraulic pump 30 is caused to operate through the pulley and belt system 22–24–26 to begin fluid flow from the sump 32. If the reel speed is as desired, the programmed output of the pump 30 will be such as to follow curve $p_o$ and the net difference pressure $p_c$ will tend to coincide with the curve $p_c$ (FIG. 2). The difference pressure $p_c$ is delivered to the hydraulic clutch 20 so that the reel is rotated at the programmed speed.

However, should for any reason the speed of the reel 10 deviate from the desired speed, as for any of the reasons hereinbefore mentioned, and let it be assumed that with such deviation the reel speed increases above that desired, the pump 30 will also increase in speed thus increasing output. This causes a greater pressure to build in line 44 considering that the opening of the valve 40 is the same for the number of reel turns elapsed thus causing a deviation from the programmed $p_o$ pressure. Since the supply pressure $p_s$ is the same, this causes a decrease in the net difference pressure $p_c$ to the clutch 20 and a proportional disengagement or slippage of the clutch plate to decrease the speed of the reel 10 bringing it back to the programmed speed. On the other hand, assuming a decrease in the speed of the reel 10 from that programmed or desired, for one of the various causes, the speed of the pump 30 will decrease, which for a given opening of valve 40, results in a deviation from the programmed pressure $p_o$ producing a larger net difference pressure $p_c$ to the clutch through the passage 94, thus increasing the engagement of the clutch plate and increasing the speed of the reel 10.

From the foregoing it will be apparent that any deviation in the speed of the reel 10 from the programmed speed will be automatically compensated for by a corresponding change in the difference pressure $p_c$.

It will be apparent that in various ways the signal system can be calibrated to provide desired controls. For example, the cylinders 76 and 78 may be equally sized to provide a 1:1 ratio of signal compensation. Alternatively, the respective sizes may be altered so that one or the other pressure signal is amplified or diminished. Further, cam face 62 may be varied to create different conditions of operation for valve 40 as desired.

Having thus described my invention, I claim:

1. Apparatus for assisting aircraft during a take-off cycle comprising a reel, a coilable element adapted to be wound on said reel during take-off, variable torque applying means coupled to said reel for controlling the speed of said reel during said cycle, and means for providing a signal to said torque applying means which is a resultant between a signal produced according to the deviation from the programmed speed of said reel and a supply signal which varies independently thereof.

2. Apparatus for assisting aircraft during a take-off cycle comprising a reel, a coilable element adapted to be wound on said reel during take-off, pressure responsive variable torque applying means coupled to said reel for controlling the speed of said reel during said cycle, first means for supplying a pressure signal ($p_s$), second means driven by rotation of said reel for supplying a programmed pressure signal ($p_o$), and means for combining said pressure signal ($p_s$) from said first means with said pressure signal ($p_o$) from said second means and supplying a resultant pressure ($p_c$) to said torque applying means maintaining an optimum rate of reel rotation.

3. The apparatus set forth in claim 2 wherein said means for combining said pressure signals includes first and second cylinders, and a piston assembly reciprocably mounted in said cylinders, said pressure signal ($p_s$) from said first means being introduced into said first cylinder to move said piston assembly in one direction with an increase thereof, said pressure signal ($p_o$) from said second means being introduced into said second cylinder tending to move said piston assembly in the other direction in opposition to said pressure signal ($p_s$), and output means from said cylinder receiving the pressure signal ($p_s$) and on the opposite side of said piston assembly from the signal introduced therein, said output means being connected to said torque applying means for delivering said resultant pressure $p_c$.

4. The apparatus set forth in claim 2 wherein said first means for applying a pressure signal ($p_s$) includes a reservoir, fluid passage means connecting said reservoir to said means for combining said pressure signals, and variable pressure means in said fluid passage means to control fluid flow therethrough in accordance with a predetermined profile.

5. The apparatus set forth in claim 2 wherein said second means for supplying a pressure signal includes a reservoir, hydraulic pump means operatively connected to said reel, fluid passage means connecting said reservoir to the inlet side of said pump, cam means operatively connected to said reel and rotated therewith, fluid passage means connecting the outlet of said pump to said reservoir and to said means for combining said pressure signals, and valve means in said fluid passage means to said reservoir from the outlet of said pump and operable by said cam means, in conjunction with the output of said pump means, to regulate the fluid flow to said means for combining said pressure signals in accordance with the speed of said reel.

6. The apparatus set forth in claim 2 wherein said pressure responsive variable torque applying means includes an hydraulically actuated clutch engageable when coiling said coilable element upon said reel.

7. In a system for assisting aircraft during a take-off cycle comprising a reel, a coilable element adapted to be wound on said reel during take-off, an hydraulically actuated device operably connected to said reel and engageable when coiling said coilable element on said reel, a first hydraulic cylinder, a second hydraulic cylinder, a piston assembly reciprocably mounted in said first and second cylinders, a first reservoir, fluid passage means connecting said first reservoir with said first cylinder, a valve in said fluid passage means and operable to transmit a pressure signal therethrough and moving said piston assembly in one direction with an increase in said pressure signal, a second reservoir, an hydraulic pump operatively connected to said reel for operation thereby, fluid passage means from said second reservoir to the input of said pump, a cam assembly operatively connected to said reel and being driven thereby, fluid passage means from the output of said pump and having branches therein, one of said branches being connected to said second cylinder such that a deviation in the pressure signal therethrough moves said piston assembly in opposition to the direction moved by said first pressure signal, a valve in said branch passage means connected to said second reservoir and operatively connected to said cam assembly such that said pressure signal to said second cylinder is a function of the pump output and corresponding valve opening as related to the speed of said reel, and fluid passage means connecting said first cylinder to said clutch for conveying thereto the resultant of said pressure signals and establishing the optimum rate of reel rotation.

8. A method of launching an aircraft by rotating a reel through variable torque means to coil an elongated coilable aircraft towing member thereon comprising the steps of; providing a program signal corresponding with a predetermined programmed speed of said reel, providing a supply signal which varies in accordance with the speed of said reel, matching said program signal with said supply signal to produce a resultant signal from said program and supply signals, and varying said variable torque means in accordance with said resultant signal to maintain the speed of said reel at said predetermined programmed speed.

References Cited

UNITED STATES PATENTS

| | | | |
|---|---|---|---|
| 3,142,458 | 7/1964 | Byrne et al. | 244—63 |
| 3,386,691 | 6/1968 | Scholl | 244—110 |

MILTON BUCHLER, Primary Examiner

P. E. SAUBERER, Assistant Examiner